UNITED STATES PATENT OFFICE.

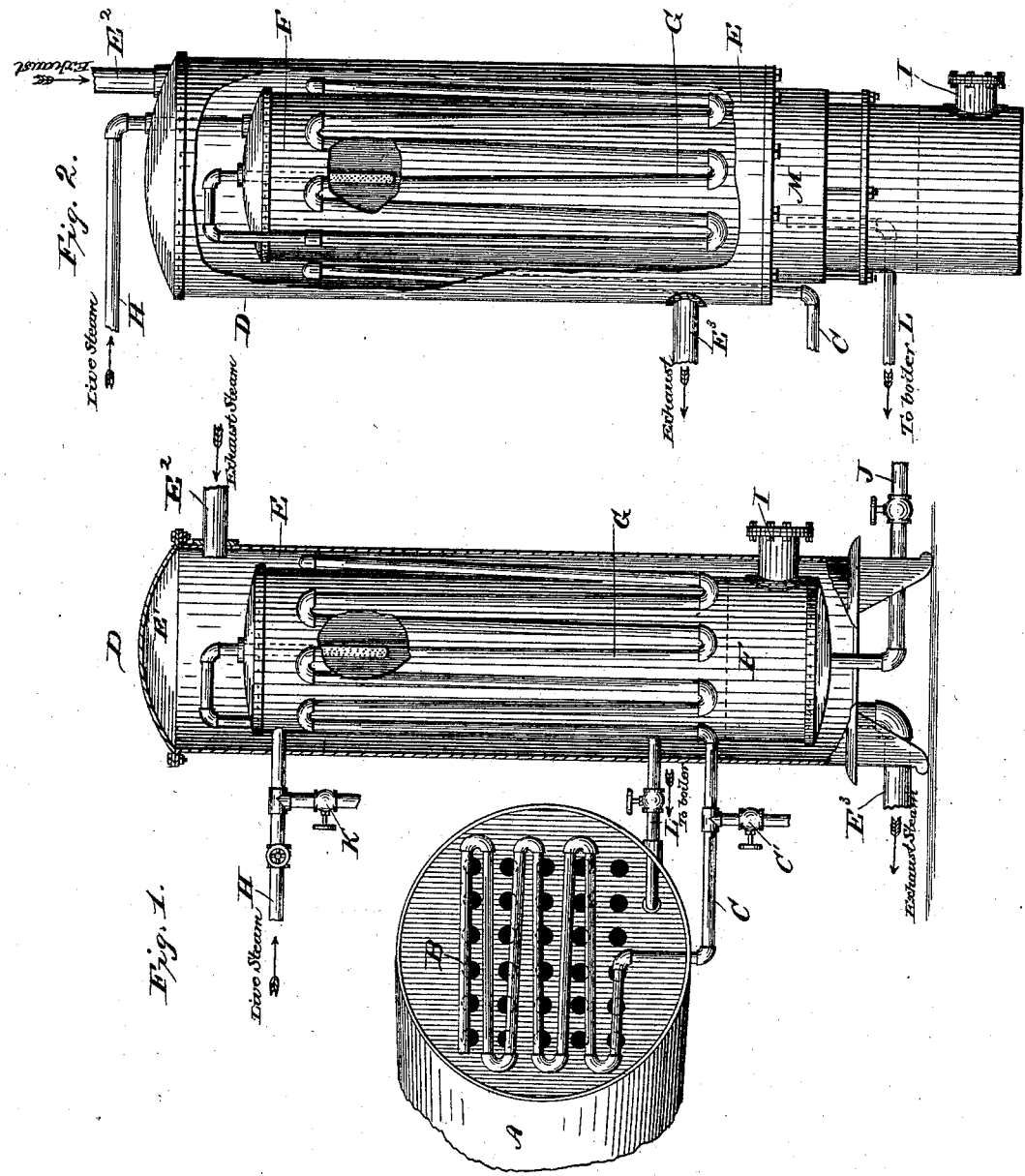

FRANK DOYLE, OF ELGIN, ILLINOIS.

FEED-WATER HEATER FOR STEAM-BOILERS.

SPECIFICATION forming part of Letters Patent No. 314,521, dated March 24, 1885.

Application filed August 15, 1884. (No model.)

*To all whom it may concern:*

Be it known that I, FRANK DOYLE, of Elgin, in the county of Kane and State of Illinois, have invented certain new and useful Improvements in Feed-Water Heaters for Steam-Boilers; and I do hereby declare the following to be a full, clear, and exact description of the same, reference being had to the accompanying drawings, forming a part of this specification, and to the figures and letters of reference marked thereon.

My invention has for its object to provide a device for heating the feed-water of steam-boilers, whereby the water may be delivered to the boiler at a temperature that will require very little heat to convert it into steam, and thus no time will be lost by reason of the steam going down, as is usual where the cool or cold water is fed; and it consists in certain details of construction and arrangement of parts, as will be hereinafter fully described, and pointed out in the claims at the end of this specification.

In the accompanying drawings, Figure 1 represents a view, partly in section, of my improved water-heater applied to a steam-boiler; Fig. 2, a view of a modified arrangement of the heater proper.

A represents a steam-boiler, of the ordinary or any preferred construction, provided with the steam-dome and tubular flues, as usual.

Across the ends of the tubular flues is secured a coil of pipe, B, which is exposed to the direct action of the fire, formed of straight pieces of pipe jointed at their ends by connecting-pieces, as shown; or it may consist of a single piece of pipe bent in a similar manner. One end of this coil is connected to the pump furnishing the water-supply, and the other is connected by means of the pipe C with the water-heating device.

D represents my improved heater, consisting of an outer chamber, E, and an inner chamber, F. The outer chamber, E, consists of a long cylinder made of boiler-iron, and provided with a removable top, E', securely fastened by bolts, and made steam-tight by means of suitable packing, and being also provided at its upper end with the pipe E², leading to the engine, for conveying the exhaust-steam to the chamber, and with a suitable exhaust-pipe, E³, at its lower end.

Supported in any suitable manner within the chamber E is a chamber or reservoir, F, for containing the feed-water, said chamber being surrounded by a coil of pipe, G, formed either of straight pipes jointed at their ends by U-shaped connections or of a single piece of pipe bent into a coil, and one end of this coil is connected with the coil B on the boiler, and its other end enters the chamber F at its top, extends downward a short distance, and is perforated, as shown, for the purpose of spraying the water as it enters the chamber and exposing it to the action of the live steam admitted to the chamber through the pipe H, connecting directly with the steam-dome of the boiler. The lower end of the chamber F forms a settling-chamber for the mud, dirt, &c., that would settle at the bottom, and a suitable man-hole, I, is provided, so that this chamber can be cleaned by hand, if desired, and it is also provided with a pipe, J, through which the mud, dirt, &c., can be blown out by the steam-pressure. This settling-chamber may, if desired, be extended below the outer chamber, as shown in Fig. 2, and the connection to the supply-pump and to the boiler, and the man-hole for cleaning out the settling-chamber be provided in the extension, which will obviate the necessity of perforating the outer cylinder for the passage through it of said pipes, a suitable stuffing-box, M, being provided for preventing the escape of steam between the two chambers. A surface blow-off is also provided at the upper end of the chamber through a portion of the length of the steam-pipe H from the boiler, a cock, K, being provided for this purpose.

The water is passed from the reservoir F to the boiler through the pipe L, as shown.

The water and sediment in the coil G can be blown out, when necessary, by opening the cock C' in the pipe C, and the cock in the pipe H from the boiler.

The operation of the device is as follows: The water enters the coil of pipe B from the pump supplying it, and is heated during its passage, thence is delivered to the vertical coil G, and is heated again by the exhaust-steam from the engine, which enters the outer chamber of the heater through pipe $E^2$ and has its exit at $E^3$, and it is sprayed from the end of the coil G into the inner chamber or reservoir, where it is heated by the live steam from the boiler to a very high temperature. When it is desired to feed water to the boiler, the cock in pipe L is opened, and the water is fed by gravity, the steam-pressure in both the boiler and reservoir being equal, and the column of water in the reservoir being higher than that in the boiler.

It will be noticed that the water fed to the boiler is taken from a point in the reservoir where the water is the clearest, the lighter impurities, &c., floating on the surface, and the heavier sediment—mud, &c.—descending to the settling-chamber at the bottom, where they can be blown off, as described; also, that the steam from the engine usually exhausted into the open air is utilized to keep the water in the reservoir at an even temperature.

I claim as my invention—

1. In a feed-water heater, the combination, with the inner reservoir, the outer shell, and the exhaust-steam space between them, of a pipe for delivering the water into the reservoir in the form of a spray, and a pipe connecting said reservoir directly with the boiler, whereby the water sprayed from the supply-pipe is subjected to the action of the highly-heated live steam, substantially as described.

2. In a feed-water-heating device, the combination, with the inner reservoir or chamber and the coil connected to the water-supply surrounding it, and having its end extended within said chamber and perforated, as shown, of the supply-pipe for admitting live steam into the reservoir, whereby the water as it is sprayed from said supply-pipe is subjected to the action of the live steam, substantially as described.

3. The combination, with the boiler having the coil B at the end thereof, of the feed-water heater having the inner steam-jacketed water chamber or reservoir, and the water and steam supply pipes leading to said reservoir, substantially as described.

4. The combination, in a water-heating device, of the coil in which the water is heated directly by the fire, the inner chamber for containing the water, and a coil surrounding said chamber connected to the water-supply and heated by the exhaust-steam from the engine, substantially as described.

5. In combination with the water-heating coil and the jacketed reservoir, the water-pipe leading from the coil into the steam-chamber, extending around the reservoir and terminating within the latter at or near the top, the steam-pipe extending from the boiler to the reservoir at the top, and the supply-pipe connecting the boiler and reservoir at or near the middle, substantially as and for the purpose set forth.

6. In a feed-water heater, the combination, with the reservoir connected to the boiler, as described, of the steam-jacket communicating with the exhaust, and the water-supply pipe extending from the water-heater within the steam-jacket and around the reservoir, to which latter said pipe is connected at the top and in line with the steam-pipe from the boiler, substantially as and for the purpose set forth.

FRANK DOYLE.

Witnesses:
D. C. JOHNSTON,
JOHN LYONS.